United States Patent
You et al.

(10) Patent No.: US 12,515,554 B2
(45) Date of Patent: Jan. 6, 2026

(54) LOCKING APPARATUS, CONNECTING STRUCTURE, AND ELECTRIC DEVICE

(71) Applicant: CONTEMPORARY AMPEREX TECHNOLOGY (HONG KONG) LIMITED, Hong Kong (CN)

(72) Inventors: Shubing You, Fujian (CN); Wenhui Zhang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 269 days.

(21) Appl. No.: 18/223,548

(22) Filed: Jul. 19, 2023

(65) Prior Publication Data

US 2023/0356619 A1 Nov. 9, 2023

Related U.S. Application Data

(63) Continuation of application No. PCT/CN2021/121476, filed on Sep. 28, 2021.

(51) Int. Cl.
  *B60L 53/80* (2019.01)
  *F16B 13/06* (2006.01)
  *F16B 39/28* (2006.01)

(52) U.S. Cl.
  CPC .......... *B60L 53/80* (2019.02); *F16B 13/063* (2013.01); *F16B 39/28* (2013.01)

(58) Field of Classification Search
  CPC ......... B60L 53/80; F16B 13/063; F16B 39/28
  See application file for complete search history.

(56) References Cited

U.S. PATENT DOCUMENTS

| 4,692,075 A | 9/1987 | Metz |
| 6,238,155 B1 | 5/2001 | Aukzemas et al. |
| 2020/0321572 A1 | 10/2020 | Bengtsson et al. |

FOREIGN PATENT DOCUMENTS

| CN | 202833559 U | 3/2013 |
| CN | 204538142 U * | 8/2015 |

(Continued)

OTHER PUBLICATIONS

Office Action issued Jan. 7, 2025 in Japanese Patent Application No. 2024-500535 with English translation thereof.

(Continued)

*Primary Examiner* — Edwin A Young
(74) *Attorney, Agent, or Firm* — XSENSUS LLP

(57) ABSTRACT

A locking apparatus may include: a housing including a first wall, where the first wall may be provided with a first opening; a bolt arranged inside the housing and penetrating out of the first opening; a sleeve arranged inside the housing and fitting around the bolt, where the sleeve and the bolt may be circumferentially locked and relatively movable in an axial direction; a restraint structure fixed at the housing to prevent the sleeve from departing from the housing in a direction leaving the first wall; and an elastic structure arranged inside the housing to apply an axial elastic force on the sleeve such that the sleeve and the restraint structure may be joined, where the restraint structure may be configured to circumferentially lock the sleeve when being joined with the sleeve; where two ends of the elastic structure may respectively abut against the first wall and the sleeve.

15 Claims, 7 Drawing Sheets

(56) References Cited

FOREIGN PATENT DOCUMENTS

| | | | |
|---|---|---|---|
| CN | 208686781 U | 4/2019 | |
| CN | 110307238 A | 10/2019 | |
| CN | 209675342 U | 11/2019 | |
| CN | 112443557 A | 3/2021 | |
| EP | 4177091 A1 | 5/2023 | |
| JP | 2006-250279 A | 9/2006 | |
| JP | 2008-215462 A | 9/2008 | |
| JP | 2019-534813 A | 12/2019 | |
| WO | WO-2018218990 A1 * | 12/2018 | ................ B60S 5/06 |
| WO | 2021/114528 A1 | 6/2021 | |

OTHER PUBLICATIONS

International Search Report and Written Opinion mailed on Jun. 23, 2022, received for PCT Application PCT/CN2021/121476, filed on Sep. 28, 2021, 9 pages including English Translation.
Extended European Search Report issued Jan. 29, 2024 in European Patent Application No. 21958693.0.
Decision to Grant a Patent issued Jul. 15, 2025 in Japanese Patent Application No. 2024-500535 with English translation thereof.
Request for the Submission of an Opinion issued Sep. 25, 2025 in Korean Patent Application No. 10-2023-7024081 with English translation thereof.

\* cited by examiner

LOCKING APPARATUS, CONNECTING STRUCTURE, AND ELECTRIC DEVICE

CROSS-REFERENCE TO RELATED APPLICATION

The present application is a continuation of International Application No. PCT/CN2021/121476, filed Sep. 28, 2021, which is incorporated herein by reference in its entirety.

TECHNICAL FIELD

This application relates to the technical field of battery assembly, and in particular, to a locking apparatus, a connecting structure, and an electric device.

BACKGROUND

With the development of new energy vehicles, fast assembly and disassembly of batteries are implemented by locking batteries using locking apparatuses.

In the prior art, locking apparatuses occupy a relatively large installation space, thus having relatively high requirements on installation conditions.

SUMMARY

The objective of this application is to provide a locking apparatus, a connecting structure, and an electric device. The locking apparatus requires a smaller installation space and therefore is suitable for different installation environments.

This application is implemented through following technical solutions:

According to a first aspect, this application provides a locking apparatus, including:
- a housing, including a first wall provided with a first opening;
- a bolt, arranged inside the housing and penetrating out of the first opening;
- a sleeve, arranged inside the housing and fitting around the bolt, where the sleeve and the bolt are circumferentially locked and relatively movable in an axial direction;
- a restraint member, fixed at the housing and configured to prevent the sleeve from departing from the housing in a direction leaving the first wall; and
- an elastic member, arranged inside the housing and configured to apply an axial elastic force on the sleeve such that the sleeve and the restraint member are joined, where the restraint member is configured to circumferentially lock the sleeve when being joined with the sleeve;
- where two ends of the elastic member respectively abut against the first wall and the sleeve.

According to the locking apparatus in the embodiments of this application, in an initial state, the sleeve is joined with the restraint member under the action of the elastic force of the elastic member and the restraint member is configured to circumferentially lock the sleeve when being joined with the sleeve. The restraint member being joined prevents the sleeve from departing from the housing in the direction leaving the first wall so that the sleeve and the bolt are limited inside the housing. To connect the bolt with a nut, the sleeve and the bolt are driven to move towards the first wall relative to the housing in the axial direction so that the sleeve departs from the restraint member, and then the sleeve and the bolt are rotated so as to connect the bolt and the bolt.

After the bolt is connected with the nut, the rotating force applied on the sleeve is removed, and the sleeve moves in the axial direction relative to the bolt under the action of the elastic force of the elastic member until being joined with the restraint member so that the sleeve is circumferentially locked by the restraint member. Because the sleeve and the bolt are circumferentially locked, the bolt is circumferentially locked. In the prior art, the elastic member is arranged between a flange face of the bolt and the sleeve, making the locking apparatus have a large size in the axial direction and thus occupy a large installation space. In the embodiments of this application, however, because the elastic member is arranged between the first wall and the sleeve, the space in the axial direction in the housing is properly utilized, which reduces the size of the bolt in the axial direction, so that the size of the locking apparatus in the axial direction can be designed to be smaller, thereby reducing the installation space occupied so as to adapt to different installation conditions.

According to some embodiments of this application, the bolt includes a threaded portion, a first transmission portion, and a locking portion which are arranged in sequence in the axial direction, where the first transmission portion and the sleeve are in transmission fit, the locking portion and the sleeve are in circumferential lock fit, and a cross-sectional area of the first transmission portion is greater than that of the locking portion.

In the above solution, the bolt is connected with the nut via the threaded portion, which facilitates the ease of assembly and disassembly. With the first transmission portion being in transmission fit with the sleeve and the cross-sectional area of the first transmission portion being greater than that of the locking portion, the first transmission portion can bear a greater maximum torque than the locking portion, increasing the maximum torque bearable by the bolt and thereby ensuring firm connection between the locking apparatus and the nut. As the locking portion and the sleeve are in circumferential lock fit, the sleeve can prevent the bolt from becoming loose; and when the sleeve is circumferentially locked, the sleeve can restrain rotation of the bolt.

According to some embodiments of this application, the sleeve includes a sleeve body and a first flange extending from one end of the sleeve body in the radial direction, where the sleeve body fits around the locking portion and is in circumferential lock fit with the locking portion, the first flange is provided with a second transmission portion corresponding to the first transmission portion, the second transmission portion is configured to be in transmission fit with the first transmission portion, and the elastic member abuts against the first flange.

In the above solution, the first flange is arranged on one end of the sleeve body, which not only facilitates abutting against the elastic member to bear the elastic force applied by the elastic member, but also facilitates arranging the second transmission portion to achieve the fit with the first transmission potion, ensuring a stable transmission fit between the sleeve and the bolt.

According to some embodiments of this application, the bolt further includes a second flange, the second flange is opposite the first flange in the axial direction, the threaded portion and the locking portion are located on two sides of the second flange, and the first transmission portion is arranged on the second flange.

In the above solution, the second flange being opposite the first flange in the axial direction helps the fit between the first transmission portion and the second transmission portion; and the threaded portion and the locking portion being located on two sides of the second flange makes the second flange closer to the first wall while sufficient length of the threaded portion is guaranteed. Due to the transmission fit between the first transmission portion and the second transmission portion, the second flange being closer to the first wall can reduce the distance between the sleeve and the first wall and reduce the size of the bolt in the axial direction, thereby reducing the size of the locking apparatus in the axial direction and reducing the installation space occupied.

According to some embodiments of this application, one of the first transmission portion and the second transmission portion is a protrusion and the other is a depression matching the protrusion in shape.

In the above solution, the fit between the protrusion and the depression makes a relatively large contact area between the first transmission portion and the second transmission portion, ensuring a stable fit between the first transmission portion and the second transmission portion.

According to some embodiments of this application, the first transmission portion and the second transmission portion are in spline fit.

In the above solution, the spline fit offers a good bearing capacity and allows the first transmission portion and the second transmission portion to move relatively in the axial direction. After the bolt is connected with the nut, the sleeve can depart from the first transmission portion under the action of the elastic force of the elastic member to be joined with the restraint member, thus circumferentially locking the bolt.

According to some embodiments of this application, an outer peripheral surface of the sleeve body is a polygonal cylindrical surface.

In the above solution, the polygonal cylindrical surface facilitates the cooperation with a tool and helps the transfer of dynamic force, so as to rotate the sleeve and the bolt to achieve connection fit between the bolt and the nut, thereby increasing the assembly efficiency and facilitating the ease of manufacturing.

According to some embodiments of this application, an inner peripheral surface of the sleeve body and an outer peripheral surface of the locking portion are both polygonal cylindrical surfaces.

In the above solution, the fit between the inner peripheral surface of the sleeve body and the outer peripheral surface of the locking portion through polygonal cylindrical surfaces can increase friction between the sleeve body and the locking portion, thereby producing good effect of circumferential lock and facilitating the ease of manufacturing.

According to some embodiments of this application, the sleeve is provided with a plurality of first cogs distributed along the circumferential direction, and the restraint member is provided with a plurality of second cogs distributed along the circumferential direction, where the plurality of second cogs are configured to be engaged with the plurality of first cogs to circumferentially lock the sleeve.

In the above solution, with the first cogs being engaged with the second cogs, a simple structure is presented to effectively prevent the sleeve from rotating relative to the restraint member, thereby producing good effect of circumferential lock.

According to some embodiments of this application, the housing further includes a second wall arranged around the first wall, one end of the second wall being connected to an edge of the first wall and the other end of the second wall defining a second opening opposite the first wall, where the restraint member is arranged at the second opening.

In the above solution, the second wall and the first wall define the inner space of the housing and the end of the second wall away from the first wall defines the second opening, so that the sleeve and the elastic member can be placed inside the housing.

According to some embodiments of this application, an outer peripheral surface of the restraint member is provided with a plurality of third cogs distributed along the circumferential direction, and an inner surface of the second wall is provided with a plurality of fourth cogs distributed along the circumferential direction, where the plurality of third cogs are engaged with the plurality of fourth cogs to circumferentially lock the restraint member.

In the above solution, with the third cogs being engaged with the fourth cogs, a simple structure is presented to effectively restrain rotation of the restraint member relative to the housing, guaranteeing the circumferential lock of the restraint member.

According to some embodiments of this application, the inner surface of the second wall is provided with a step face and the locking apparatus further includes a circlip, where a side of the restraint member facing the first wall abuts against the step face and a side of the restraint member facing away from the first wall abuts against the circlip, so as to axially lock the restraint member.

In the above solution, cooperation of the step face and the circlip can restrain the restraint member from moving in the axial direction. In addition, as it is easy to mount and remove the circlip, the efficiency of assembly and repair can be improved while the presence of axial limit is guaranteed.

According to a second aspect, this application further provides a connecting structure, including:
 a first substrate;
 a second substrate;
 a nut, fixed on the first substrate; and
 the locking apparatus according to the foregoing embodiments, where the locking apparatus is fixed on the second substrate and the bolt of the locking apparatus is connected with the nut to lock the second substrate to the first substrate.

According to the connecting structure of the embodiments of this application, the connection fit between the bolt of the locking apparatus and the nut allows the second substrate to be locked to the first substrate, which facilitates the ease of assembly and disassembly, thereby increasing the efficiency of assembly and repair.

According to some embodiments of this application, the second substrate is provided with an accommodating cavity, the housing of the locking apparatus is arranged inside the accommodating cavity, an inner wall of the accommodating cavity is provided with a through hole, and the housing further includes a boss, where the boss is formed on an outer peripheral surface of the first wall and arranged around the first opening and the boss is inserted in the through hole and in interference fit with the through hole.

In the above solution, with the boss inserted into the through hole in the inner wall of the accommodating cavity and being in interference fit with the through hole, a connection area between the housing and the second substrate is increased so as to guarantee the connecting strength between the housing and the second substrate.

According to some embodiments of this application, an outer peripheral surface of the boss is provided with a plurality of fifth cogs distributed along the circumferential direction.

In the above solution, the plurality of fifth cogs being in interference fit with the through hole provides a good anti-rotation effect and increases the connecting strength between the housing and the second substrate.

According to some embodiments of this application, the housing is rectangular and the accommodating cavity matches the housing in shape.

In the above solution, the rectangular shape can prevent the housing from rotating relative to the second substrate, providing a good anti-rotation effect.

According the third aspect, this application further provides an electric device, including:
a device body;
a battery; and
the connecting structure according to the foregoing embodiments, where the first substrate is fixed on the device body and the second substrate is fixed on the battery.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

To describe the technical solutions in the examples of this application more clearly, the following briefly describes the accompanying drawings required for describing the examples of this application. Apparently, the accompanying drawings in the following descriptions show merely some examples of this application, and persons of ordinary skill in the art may still derive other drawings from the accompanying drawings without creative efforts.

Figure 1:
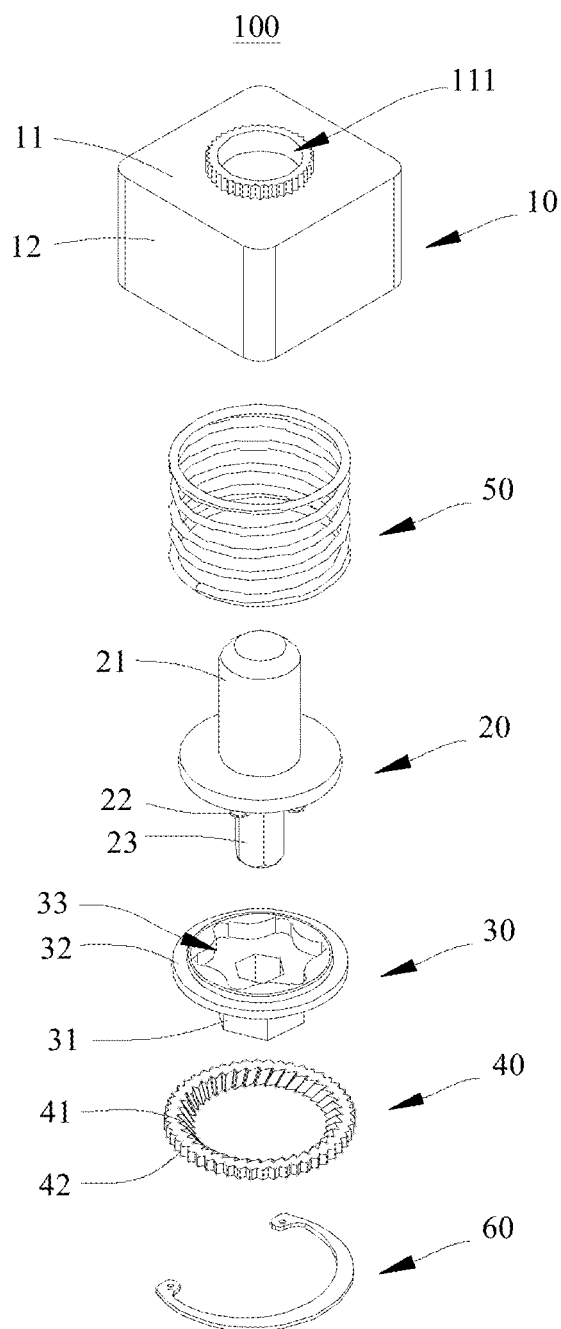
FIG. 1 is an exploded view of a locking apparatus according to some embodiments of this application.

The accompanying drawings are not drawn to scale.

Reference signs are described as follows: 100. locking apparatus; 10. housing; 11. first wall; 111. first opening; 12. second wall; 121. second opening; 122. step face; 123. first groove; 124. second groove; 13. boss; 131. fifth cog; 20. bolt; 21. threaded portion; 22. first transmission portion; 23. locking portion; 24. second flange; 30. sleeve; 31. sleeve body; 32. first flange; 33. second transmission portion; 34. first cog; 40. restraint member; 41. second cog; 42. third cog; 50. elastic member; 60. circlip; 61. circlip body; 62. circlip ear; 700. first substrate; 800. second substrate; 810. accommodating cavity; 820. through hole; 900. nut; 910. threaded fastener; and 1000. connecting structure.

DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In the description of the embodiments of this application, the terms "first", "second" and the like are merely intended to distinguish between different objects, and shall not be understood as any indication or implication of relative importance or any implicit indication of the number, sequence or primary-secondary relationship of the technical features indicated. In the descriptions of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the apparatuses or components mentioned must have specific orientations or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, any may refer to a direct connection, an indirect connection via an intermediate medium, or an interaction between two elements. Persons of ordinary skill in the art can understand specific meanings of these terms in this application as appropriate to specific situations.

Currently, during the assembly of new energy vehicles, a fast-changing connecting structure is often used to improve the efficiency of assembly and repair. For example, batteries are typically fixed on cars by using locking apparatuses.

In the prior art, locking apparatuses occupy a relatively large installation space, thus having relatively high requirements on installation conditions. The inventors have noticed that the factor causing a locking apparatus to occupy a relatively large installation space is the large size of a bolt in the axial direction. A further study finds that the bolt of a locking apparatus is provided with a flange face protruding in a radial direction, where the flange face is opposite a sleeve in the axial direction, and an elastic member inside a housing of the locking apparatus is arranged between the flange face of the bolt and the sleeve, leaving a large distance between the flange face of the bolt and the sleeve, which makes the bolt have a large size in the axial direction and makes a large distance between the sleeve and the threaded portion of the bolt, thereby making the locking apparatus have a large size in the axial direction and causing the locking apparatus to occupy a large installation space and therefore have higher requirements on installation conditions.

In view of this, to resolve the problem that locking apparatuses occupy a large installation space and high requirements on installation conditions, the inventors have designed a locking apparatus after an in-depth study, where the locking apparatus includes a housing, a bolt, a sleeve, a restraint member, and an elastic member. The housing includes a first wall, where the first wall is provided with a first opening. The bolt is arranged inside the housing and penetrates out of the first opening. The sleeve is arranged inside the housing and fits around the bolt, where the sleeve and the bolt are circumferentially locked and relatively movable in an axial direction. The restraint member is fixed at the housing and configured to prevent the sleeve from departing from the housing in a direction leaving the first wall. The elastic member is arranged inside the housing and configured to apply an axial elastic force on the sleeve such that the sleeve and the restraint member are joined, where the restraint member circumferentially locks the sleeve when being joined with the sleeve. Two ends of the elastic member respectively abut against the first wall and the sleeve.

In such locking apparatus, in an initial state, the sleeve is joined with the restraint member under the action of the elastic force of the elastic member and the restraint member is configured to circumferentially lock the sleeve when being joined with the sleeve. The restraint member being joined prevents the sleeve from departing from the housing in the direction leaving the first wall so that the sleeve and the bolt are limited inside the housing. To connect the bolt with a nut, the sleeve and the bolt are driven to move towards the first wall relative to the housing in the axial direction, so that the sleeve departs from the restraint member. After the sleeve has departed from the restraint member, the sleeve and bolt are rotated so as to connect the bolt and the nut. After the bolt is connected with the nut, the force applied on the sleeve is removed, and the sleeve moves in the axial direction under the action of the elastic force of the elastic member until being joined with the restraint member so that the restraint member circumferentially locks the sleeve. Because the sleeve and the bolt are circumferentially locked, the bolt is circumferentially locked.

Because the two ends of the elastic member respectively abut against the first wall and the sleeve, the distance between the sleeve and the first wall is reduced, so that the inner space of the housing is properly utilized, which can reduce the size of the bolt in the axial direction, so that the size of the locking apparatus in the axial direction can be designed to be smaller, thereby reducing the installation space occupied so as to adapt to different installation conditions.

The embodiments of this application provide a locking apparatus. The locking apparatus can be used for, without limitation, the assembly of vehicles, for example, the assembly of batteries and car bodies of new energy vehicles, and can also be used for the assembly of any other two components requiring connection.

Figure 2:
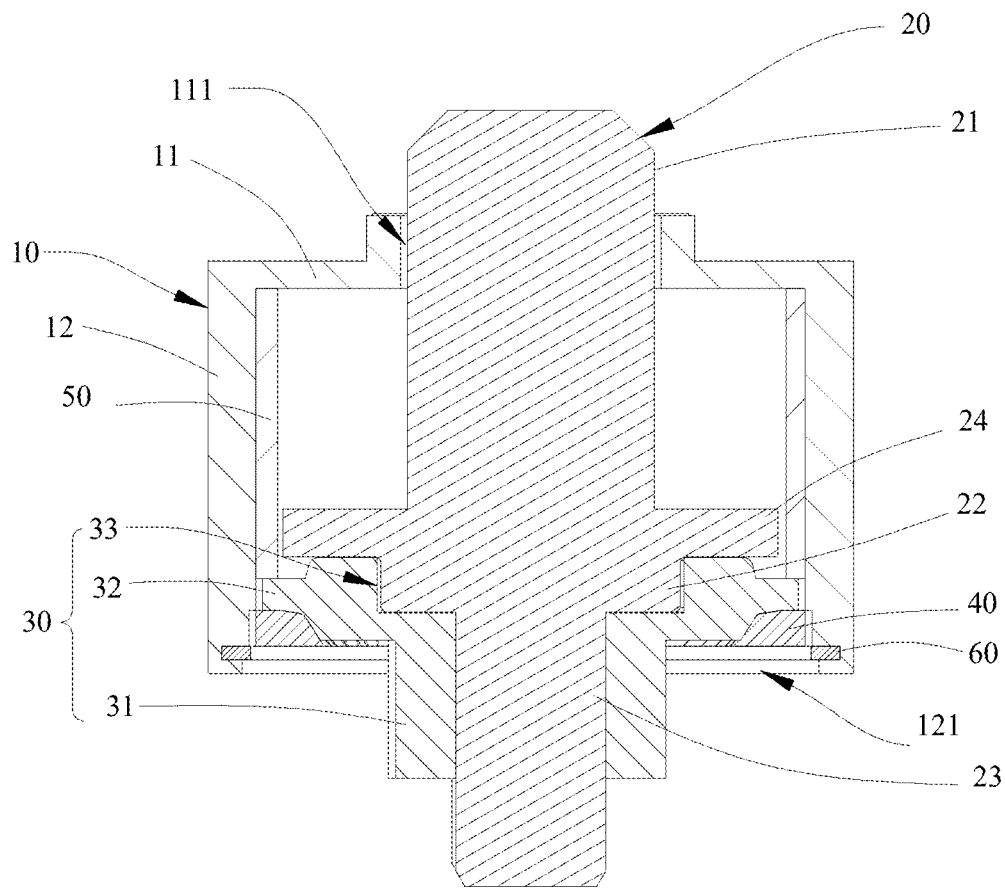
FIG. 2 is a cross-sectional view of a locking apparatus according to some embodiments of this application.

Referring to FIG. 1 and FIG. 2, FIG. 1 is an exploded view of a locking apparatus 100 according to some embodiments of this application and FIG. 2 is a cross-sectional view of the locking apparatus 100 according to some embodiments of this application. According to some embodiments of this application, as shown in FIG. 1 and FIG. 2, this application provides a locking apparatus 100 including a housing 10, a bolt 20, a housing 30, a restraint member 40, and an elastic member 50. The housing 10 includes a first wall 11, where the first wall 11 is provided with a first opening 111. The bolt 20 is arranged inside the housing 10 and penetrates out of the first opening 111. The sleeve 30 is arranged inside the housing 10 and fits around the bolt 20, where the sleeve 30 and the bolt 20 are circumferentially locked and relatively movable in an axial direction. The restraint member 40 is fixed on the housing 10, where the restraint member 40 is configured to restrain the sleeve 30 from departing from the housing 10 in a direction leaving the first wall 11. The elastic member 50 is arranged inside the housing 10, where the elastic member 50 is configured to apply an axial elastic force on the sleeve 30 such that the sleeve 30 and the restraint member 40 are joined, and the restraint member 40 is configured to circumferentially lock the sleeve 30 when being joined with the sleeve 30.

It should be noted that because the sleeve 30 fits around the bolt 20 and the bolt 20 is so arranged as to run through the first opening 111, the axis of the sleeve 30 coincides with that of the bolt 20, and the axis of the bolt 20 coincides with that of the first opening 111. Therefore, for the ease of description, the circumferential direction mentioned in the embodiments of this application is a circumferential direction of the bolt 20, the axial direction mentioned is an axial direction of the bolt 20, and the radial direction mentioned is a radial direction of the bolt 20. Being circumferentially locked means that circumferential rotation is restrained, for example, two mutually-fitting components are restrained from circumferentially rotating relative to each other. Being axially locked means that the position of a component is limited in the axial direction, so that the component is restrained from moving in the axial direction.

The first wall 11 is a component constituting the housing 10 and has some thickness.

The bolt 20 penetrating out of the first opening 111 means that most of the bolt 20 is located inside the housing 10 with an end part of one end of the bolt 20 penetrating out of the housing 10 from the first opening 111.

With the sleeve 30 fitting around the bolt 20 and the sleeve 30 and the bolt 20 circumferentially locked, the fit between the sleeve 30 and the bolt 20 can limit rotation of the bolt 20 in the circumferential direction relative to the sleeve 30. The sleeve 30 and the bolt 20 being relatively movable in the axial direction means that the sleeve 30 can move in the axial direction relative to the bolt 20. When the sleeve 30 has overcome the elastic force of the elastic member 50 and moves towards the first wall 11, a joining area between the sleeve 30 and the restraint member 40 grows gradually smaller and after the sleeve 30 departs from the restraint member 40, the sleeve 30 can circumferentially rotate relative to the elastic member 50, thus removing the circumferential lock on the sleeve 30.

The restraint member 40 being fixed on the housing 10 means that the restraint member 40 has a fixed position relative to the housing 10. For example, the restraint member can be fixed on the housing 10 via a detachable component, and when the detachable component is detached, the restraint member 40 can be separated from the housing 10. The restraint member 40 is configured to prevent the sleeve 30 from departing from the housing 10 in the direction leaving the first wall 11, the restraint member 40 applies a blocking force on a side of the sleeve 30 facing away from the first wall 11, and the restraint member 40 may be arranged on the side of the sleeve 30 facing away from the first wall 11.

The elastic member 50 fits around the outside of the bolt 20 and two ends of the elastic member 50 respectively abut against the first wall 11 and the sleeve 30, where the elastic member 50 is located on the side of the sleeve 30 facing the first wall 11 and is, together with the restraint member 40, configured to prevent the sleeve 30 from departing from the housing 10 in the direction leaving the first wall 11. Thus, the elastic member 50 and the restraint member 40 together limit the sleeve 30 in the axial direction.

According to the locking apparatus 100 in the embodiments of this application, in an initial state, the sleeve 30 is joined with the restraint member 40 under the action of the elastic force of the elastic member 50 and the restraint member 40 is configured to circumferentially lock the sleeve 30 when being joined with the sleeve 30. The restraint member 40 being jointed prevents the sleeve 30 from departing from the housing 10 in the direction leaving the first wall 11 so that the sleeve 30 and bolt 20 are limited inside the housing 10. To connect the bolt 20 with a nut, the sleeve 30 and the bolt 20 are driven to move towards the first wall 11 relative to the housing 10 in the axial direction, and the sleeve 30 presses against the elastic member 50 so that the sleeve 30 gradually approaches the first wall 11, and when the sleeve 30 departs from the restraint member 40, the bolt 20 comes into contact with the nut, and the sleeve 30 and bolt 20 are rotated so as to connect the bolt 20 and the nut. After the bolt 20 is connected with the nut, the rotating force applied on the sleeve 30 is removed, and the sleeve 30 moves in the axial direction relative to the bolt 20 under the action of the elastic force of the elastic member 50 until being joined with the restraint member 40 so that the sleeve 30 is circumferentially locked by the restraint member 40. Because the sleeve 30 and the bolt 20 are circumferentially locked, the bolt 20 is circumferentially locked. In the prior art, the elastic member 50 is arranged between a flange face of the bolt 20 and the sleeve 30, making the locking apparatus 100 have a large size in the axial direction and thus occupy a large installation space. In the embodiments of this application, however, because the elastic member 50 is arranged between the first wall 11 and the sleeve 30, the distance between the sleeve 30 and the first wall 11 of the housing 10 is reduced, and the space in the axial direction in the housing 10 is properly utilized, which reduces the size of the bolt 20 in the axial direction so that the size of the locking apparatus 100 in the axial direction can be designed to be smaller, thereby reducing the installation space occupied so as to adapt to different installation conditions.

Figure 3:
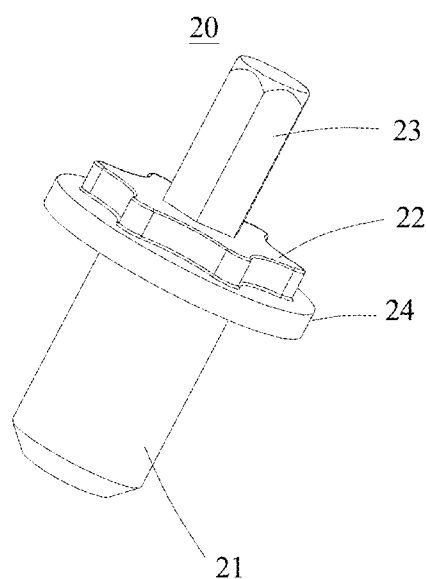
FIG. 3 is a schematic structural diagram of a bolt according to some embodiments of this application.

Referring to FIG. 3, FIG. 3 is a schematic structural diagram of a locking apparatus according to some embodiments of this application with reference to FIG. 1 and FIG. 2. According to some embodiments of this application, optionally, as shown in FIG. 1 to FIG. 3, the bolt 20 includes a threaded portion 21, a first transmission portion 22, and a locking portion 23 which are arranged in sequence in the axial direction, where the first transmission portion 22 and the sleeve 30 are in transmission fit, the locking portion 23 and the sleeve 30 are in circumferential lock fit, and a cross-sectional area of the first transmission portion 22 is greater than that of the locking portion 23.

The cross-sectional area is an area of a projection of the component in a plane perpendicular to the axial direction of the bolt 20. For example, the cross-sectional area of the first transmission portion 22 is an area of a projection of the first transmission portion 22 in the plane perpendicular to the axial direction and the cross-sectional area of the locking portion 23 is an area of a projection of the locking portion 23 in the plane perpendicular to the axial direction.

The first transmission portion 22 and the sleeve 30 being in transmission fit means that transfer of dynamic force for circumferential rotation of the bolt 20 and the sleeve 30 is achieved by the transmission fit between the first transmission portion 22 and the sleeve 30. To be specific, an external force is applied on the sleeve 30, the force experienced by the sleeve 30 is transferred to the first transmission portion 22 to drive the bolt 20 to rotate. For example, when the bolt 20 is being driven to rotate, the driving force is applied on the sleeve 30 and then the sleeve 30 transfers the driving force to the first transmission portion 22 to drive the bolt 20 to rotate. With the first transmission portion 22 and the sleeve 30 in transmission fit, the first transmission portion 22 and the sleeve 30 can also be circumferentially locked. In other words, the first transmission portion 22 can restrain the sleeve 30 and the bolt 20 from relative rotation.

The locking portion 23 and the sleeve 30 are in circumferential lock fit. In this way, the locking portion 23 does not participate in the transfer of the dynamic force for rotation of the bolt 20 between the bolt 20 and the sleeve 30, but only participates in the restraint of circumferential rotation between the bolt 20 and the sleeve 30.

The bolt 20 is connected with the nut via the threaded portion 21, which facilitates the ease of assembly and disassembly. With the first transmission portion 22 being in transmission fit with the sleeve 30 and the cross-sectional area of the first transmission portion 22 being greater than that of the locking portion 23, the first transmission portion 22 can bear a greater maximum torque than the locking portion 23, increasing the maximum torque bearable by the bolt 20 and thereby ensuring firm connection between the locking apparatus 100 and the nut. As the locking portion 23 and the sleeve 30 are in circumferential lock fit, the sleeve 30 can prevent the bolt 20 from becoming loose; and when the sleeve 30 is circumferentially locked, the sleeve 30 can restrain rotation of the bolt 20.

Figure 4:
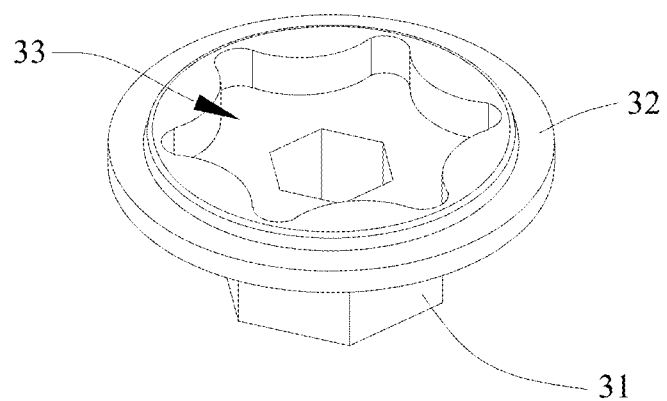
FIG. 4 is a first schematic structural diagram of a sleeve according to some embodiments of this application.
Figure 5:
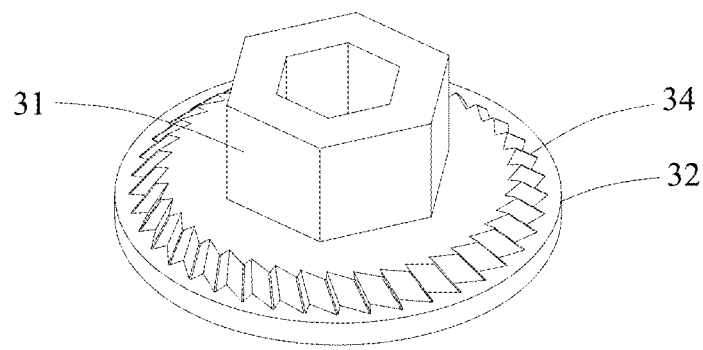
FIG. 5 is a second schematic structural diagram of a sleeve according to some embodiments of this application.

Referring to FIG. 4 and FIG. 5, FIG. 4 is a first schematic structural diagram of the sleeve 30 according to some embodiments of this application (top view), and FIG. 5 is a second schematic structural diagram of the sleeve according to some embodiments of this application (bottom view). FIG. 4 and FIG. 5 demonstrate the structure of the sleeve 30 from two axial sides. According to some embodiments of this application, optionally, as shown in FIG. 2, FIG. 4, and FIG. 5, the sleeve 30 includes a sleeve body 31 and a first flange 32 extending from one end of the sleeve body 31 in the radial direction, where the sleeve body 31 fits around the locking portion 23 and is in circumferential lock fit with the locking portion 23, the first flange 32 is provided with a second transmission portion 33 corresponding to the first transmission portion 22, the second transmission portion 33 is configured to be in transmission fit with the first transmission portion 22, and the elastic member 50 abuts against the first flange 32.

The first flange 32 is located at one end of the sleeve body 31 and the first flange 32 protrudes out of the sleeve body 31 in the radial direction. In other words, the first flange 32 is connected to an outer peripheral surface of the sleeve body 31.

The second transmission portion 33 is configured to be in transmission fit with the first transmission portion 22, which means that dynamic force is transferred between the sleeve 30 and the bolt 20 via the fit between the second transmission portion 33 and the first transmission portion 22.

The elastic member 50 abuts against the first flange 32 and the first flange 32 is located at an end of the sleeve body 31 close to the first wall 11, so that the second transmission portion 33 is in transmission fit with the first transmission portion 22, reducing the size of the bolt 20 in the axial direction and the size of the locking apparatus 100 in the axial direction.

The first flange 32 being arranged at one end of the sleeve body 31 not only facilitates abutting against the elastic member 50 to bear the elastic force applied by the elastic member 50, but also facilitates arrangement of the second transmission portion 33 to achieve the fit with the first transmission potion 22, ensuring a stable transmission fit between the sleeve 30 and the bolt 20.

Figure 6:
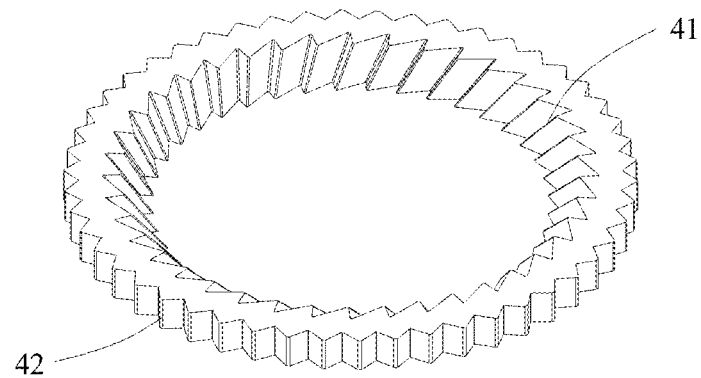
FIG. 6 is a schematic structural diagram of a restraint member according to some embodiments of this application.

Referring to FIG. 6, FIG. 6 is a schematic structural diagram of the restraint member 40 according to some embodiments of this application. As shown in FIG. 6, the restraint member 40 is a ring structure, where the sleeve body 31 penetrates the restraint member 40 (refer to FIG. 2), so that a tool can act on the sleeve body 31 to drive the sleeve 30 to rotate.

According to some embodiments of this application, optionally, as shown in FIG. 2 and FIG. 3, the bolt 20 further includes a second flange 24, where the second flange 24 is opposite the first flange 32 in the axial direction, the threaded portion 21 and the locking portion 23 are located on two sides of the second flange 24, and the first transmission portion 22 is arranged on the second flange 24.

The second flange 24 is opposite the first flange 32 in the axial direction, the second flange 24 and the first flange 32 are arranged in sequence in the axial direction, and the second flange 24 faces the first flange 32, so that the first transmission portion 22 fits with the second transmission portion 33.

The threaded portion 21 and the locking portion 23 being located on two sides of the second flange 24 means that in the axial direction, the second flange 24 separates the threaded portion 21 and the locking portion 23. The first flange 32 being located at the end of the sleeve body 31 close to the first wall 11 makes a small distance between the first flange 32 and the second flange 24 and even makes two opposite faces of the first flange 32 and the second flange 24 contact with each other.

The second flange 24 being opposite the first flange 32 in the axial direction helps the fit between the first transmission portion 22 and the second transmission portion 33. The threaded portion 21 and the locking portion 23 being located on two sides of the second flange 24 makes the second flange 24 closer to the first wall 11 while sufficient length of the threaded portion 21 in the axial direction is guaranteed. Due to the transmission fit between the first transmission portion 22 and the second transmission portion 33, the second flange 24 being closer to the first wall 11 can reduce the distance between the sleeve 30 and the first wall 11 and reduce the size of the bolt 20 in the axial direction, thereby reducing the size of the locking apparatus 100 in the axial direction and reducing the installation space occupied.

According to some embodiments of this application, optionally, one of the first transmission portion 22 and the second transmission portion 33 is a protrusion and the other is a depression matching the protrusion in shape.

The first transmission portion 22 and the second transmission portion 33 may be presented in two ways. In a first way, as shown in FIG. 3 and FIG. 4, the first transmission portion 22 is a protrusion and the second transmission portion 33 is a depression; and in a second way, the first transmission portion 22 is a depression and the second transmission portion 33 is a protrusion. The protrusion and the depression match in contour, and they are in transmission fit when the protrusion is inserted into the depression.

The fit between the protrusion and the depression makes a relatively large contact area between the first transmission portion 22 and the second transmission portion 33, ensuring a stable fit between the first transmission portion 22 and the second transmission portion 33.

In some embodiments, in the case that the bolt 20 has no second flange 24, the first transmission portion 22 may also be a protrusion on the bolt 20.

According to some embodiments of this application, optionally, the first transmission portion 22 and the second transmission portion 33 are in spline fit.

In the embodiment that the first transmission portion 22 is a protrusion and the second transmission portion 33 is a depression, as shown in FIG. 3 and FIG. 4, the first transmission portion 22 is a flower-shaped protrusion and the second transmission portion 33 is a flower-shaped depression. Such spline fit can transfer a strong torque.

The first transmission portion 22 and the second transmission portion 33 being in spline fit offers a good bearing capacity and allows the first transmission portion 22 and the second transmission portion 33 to move relatively in the axial direction. After the bolt 20 is firmly connected with the nut, the sleeve 30 can move in the direction leaving the first wall 11 under the action of the elastic force of the elastic member 50, so that the second transmission portion 33 gradually departs from the first transmission portion 22. After the second transmission portion 33 has departed from the first transmission portion 22, the sleeve 30 continues to move until the sleeve 30 is joined with the restraint member 40, and the sleeve 30 being joined with the restraint member 40 makes the bolt 20 circumferentially locked.

According to some embodiments of this application, optionally, as shown in FIG. 4 and FIG. 5, an outer peripheral surface of the sleeve body 31 is a polygonal cylindrical surface.

Having a polygonal cylindrical surface means that the outer peripheral surface of the sleeve body 31 consists of a plurality of cylindrical surfaces, where the plurality of cylindrical surfaces are connected in sequence in the circumferential direction to enclose a polygonal cylindrical structure.

The polygonal cylindrical surface facilitates the cooperation with a tool and helps the transfer of dynamic force, so as to rotate the sleeve 30 and the bolt 20 to achieve connection fit between the bolt 20 and the nut, thereby increasing the assembly efficiency and facilitating the ease of manufacturing.

Optionally, the outer peripheral surface of the sleeve body 31 is a hexagonal cylindrical surface having three opposite pairs of cylindrical surfaces, which facilitates the cooperation between the sleeve body 31 and the tool.

According to some embodiments of this application, optionally, as shown in FIG. 3 and FIG. 4, an inner peripheral surface of the sleeve body 31 and an outer peripheral surface of the locking portion 23 are both polygonal cylindrical surfaces.

The sleeve body 31 fits around the locking portion 23 and the inner peripheral surface of the sleeve body 31 matches the outer peripheral surface of the locking portion 23. In other words, the inner peripheral surface of the sleeve body 31 matches the outer peripheral surface of the locking portion 23 in shape.

The fit between the inner peripheral surface of the sleeve body 31 and the outer peripheral surface of the locking portion 23 through polygonal cylindrical surfaces can increase friction between the sleeve body 31 and the locking portion 23, thereby producing good effect of circumferential lock and facilitating the ease of manufacturing.

Optionally, the inner peripheral surface of the sleeve body 31 and the outer peripheral surface of the locking portion 23 are both hexagonal cylindrical surfaces, which facilitates the ease of manufacturing.

According to some embodiments of this application, optionally, as shown in FIG. 5 and FIG. 6, the sleeve 30 is provided with a plurality of first cogs 34 distributed along the circumferential direction, and the restraint member 40 is provided with a plurality of second cogs 41 distributed along the circumferential direction, where the plurality of second cogs 41 are configured to be engaged with the plurality of first cogs 34 to circumferentially lock the sleeve 30.

In the embodiment that the sleeve 30 includes a sleeve body 31 and a first flange 32 extending from one end of the sleeve body 31 in the radial direction, the plurality of first cogs 34 are arranged on the first flange 32 and located on a side of the first flange 32 facing the restraint member 40, so as to be engaged with the plurality of second cogs 41. In the embodiment that the restraint member 40 is a ring structure, the plurality of second cogs 41 are located on the inner peripheral surface of the restraint member 40.

With the first cogs 34 being engaged with the second cogs 41, a simple structure is presented to effectively prevent the sleeve 30 from rotating relative to the restraint member 40, thereby producing good effect of circumferential lock.

Optionally, the first cogs 34 and the second cogs 41 are both inclined cogs, so that the sleeve body 31 and the restraint member 40 have a large contact area. As shown in the figures, the plurality of first cogs 34 are located on the side of the first flange 32 facing away from the first wall 11 and the plurality of second cogs 41 are located on the inner peripheral surface of the restraint member 40.

Figure 7:
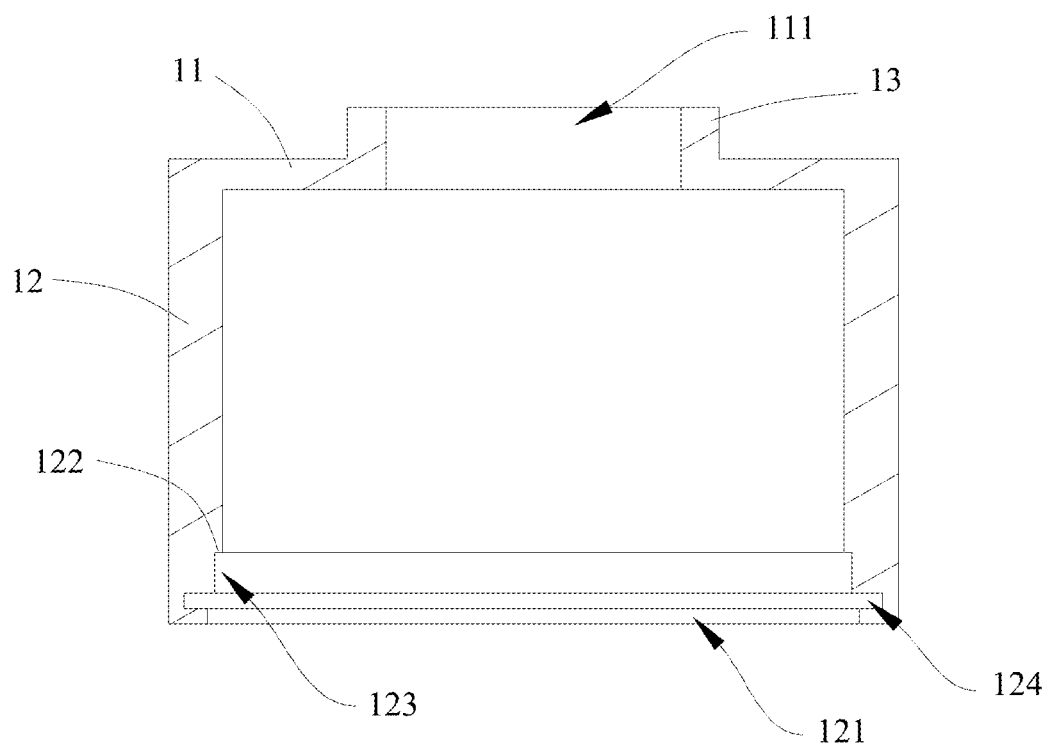
FIG. 7 is a cross-sectional view of a housing according to some embodiments of this application.

Referring to FIG. 7, FIG. 7 is a cross-sectional view of the housing 10 according to some embodiments of this application. According to some embodiments of this application, optionally, as shown in FIG. 7, the housing 10 further includes a second wall 12, where the second wall 12 is arranged around the first wall 11. One end of the second wall 12 is connected to an edge of the first wall 11, the other end of the second wall 12 defines a second opening 121 opposite the first wall 11, and the restraint member 40 (refer to FIG. 2) is arranged at the second opening 121.

With the second wall 12 arranged around the first wall 11 and one end of the second wall 12 connected to the edge of the first wall 11, an inner surface of the first wall 11 and an inner surface of the second wall 12 define an inner space of the housing 10.

The restraint member 40 being arranged at the second opening 121 may be the restraint member 40 being located inside the housing 10 or the restraint member 40 being located outside the housing 10, provided that the restrain member 40 can prevent the sleeve 30 from departing off the housing 10 from the second opening 121 in the direction leaving the first wall 11.

The inner surface of the second wall 12 is a cylindrical surface, so that the bolt 20 and the sleeve 30 can rotate in the housing 10.

The first opening 111 and the second opening 121 are both circular structures, where a diameter of the second opening 121 is greater than that of the first opening 111, so that the sleeve 30 and the elastic member 50 can be placed into the housing 10 from the second opening 121.

The second wall 12 and the first wall 11 define the inner space of the housing and an end of the second wall 12 away from the first wall 11 defines the second opening 121, so that the sleeve 30 and the elastic member 50 can be placed into the housing 10 from the second opening 121.

According to some embodiments of this application, optionally, as shown in FIG. 6, an outer peripheral surface of the restraint member 40 is provided with a plurality of third cogs 42 distributed along the circumferential direction, and an inner peripheral surface of the second wall 12 is provided with a plurality of fourth cogs (not shown in the figure) distributed along the circumferential direction, where the plurality of third cogs 42 are engaged with the plurality of fourth cogs to circumferentially lock the restraint member 40.

The outer peripheral surface of the restraint member 40 is a surface of the restraint member 40 for joining with the second wall 12.

With the third cogs 42 being engaged with the fourth cogs, a simple structure is presented to effectively restrain rotation of the restraint member 40 relative to the housing 10, guaranteeing the circumferential lock of the restraint member 40.

According to some embodiments of this application, optionally, as shown in FIG. 1, FIG. 2, and FIG. 7, the inner surface of the second wall 12 is provided with a step face 122, and the locking apparatus 100 further includes a circlip 60, where a side of the restraint member 40 facing the first wall 11 abuts against the step face 122, and the side of the restraint member 40 facing away from the first wall 11 abuts against the circlip 60 to circumferentially lock the restraint member 40 in the axial direction.

As shown in FIG. 7, the inner surface of the second wall 12 is partly recessed in a direction leaving the axis of the bolt 20 to form a first groove 123, where a groove wall of the first groove 123 forms the step face 122, and the step face 122 is arranged parallel to the first wall 11. The restraint member 40 is partly accommodated in the first groove 123 and the side of the restraint member 40 facing the first wall 11 abuts against the step face 122, where the step face 122 restrains the restraint member 40 from moving towards the first wall 11.

As shown in FIG. 7, the inner surface of the second wall 12 is provided with a second groove 124, where the second groove 124 is located at an end of the first groove 123 away from the first wall 11 in the axial direction, the circlip 60 is arranged inside the second groove 124, and the restraint member 40 is arranged between the circlip 60 and the step face 122.

Cooperation between the step face 122 and the circlip 60 can restrain the restraint member 40 from moving in the axial direction. In addition, as it is easy to mount and remove the circlip 60, the efficiency of assembly and repair can be improved while the presence of axial limit is guaranteed.

Figure 8:
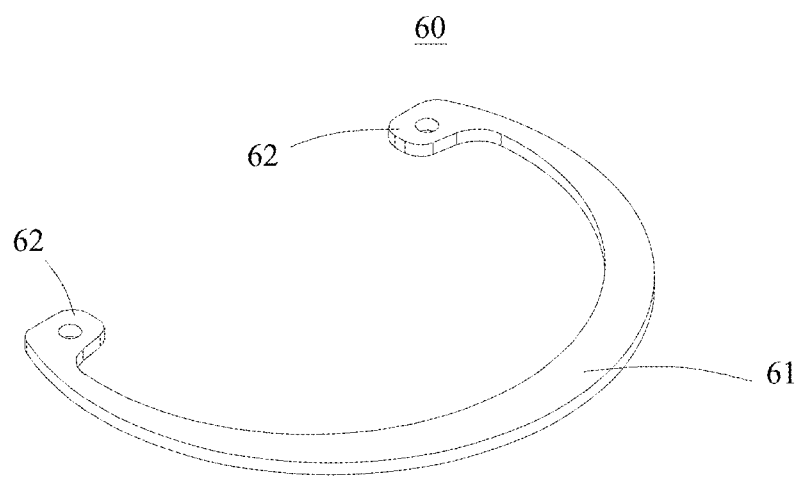
FIG. 8 is a schematic structural diagram of a circlip according to an embodiment of this application.

Referring to FIG. 8, FIG. 8 is a schematic structural diagram of the circlip 60 according to some embodiments of this application. In some embodiments, as shown in FIG. 8, the circlip 60 includes a circlip body 61 and circlip ears 62 located at two ends of the circlip body 61, where the circlip body 61 is an arc structure; and the circlip ears 62 are provided with clamp holes to fit with a circlip clamp. Optionally, an angle of the circlip body 61 is greater than 180 degrees.

According to some embodiments of this application, the elastic member 50 may be a component having elasticity, such as a spring, rubber, or the like. Optionally, as shown in FIG. 1, the elastic member 50 is a spring.

Figure 9:
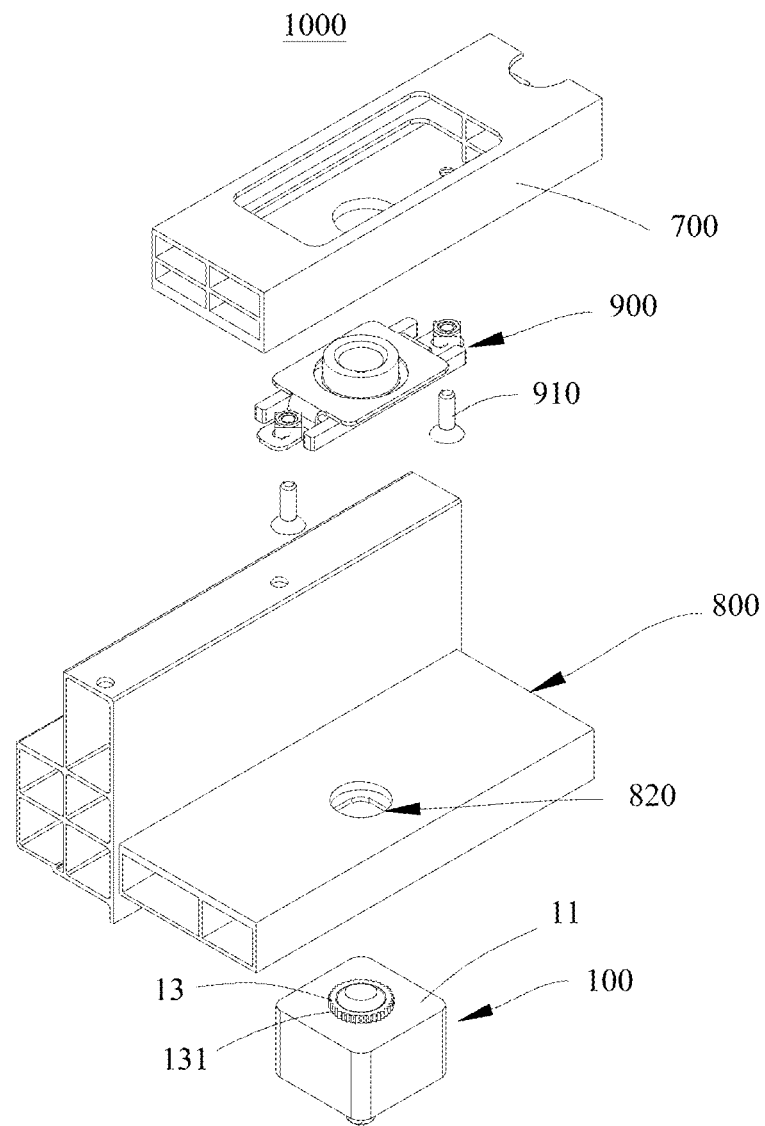
FIG. 9 is an exploded view of a connecting structure according to some embodiments of this application.
Figure 10:
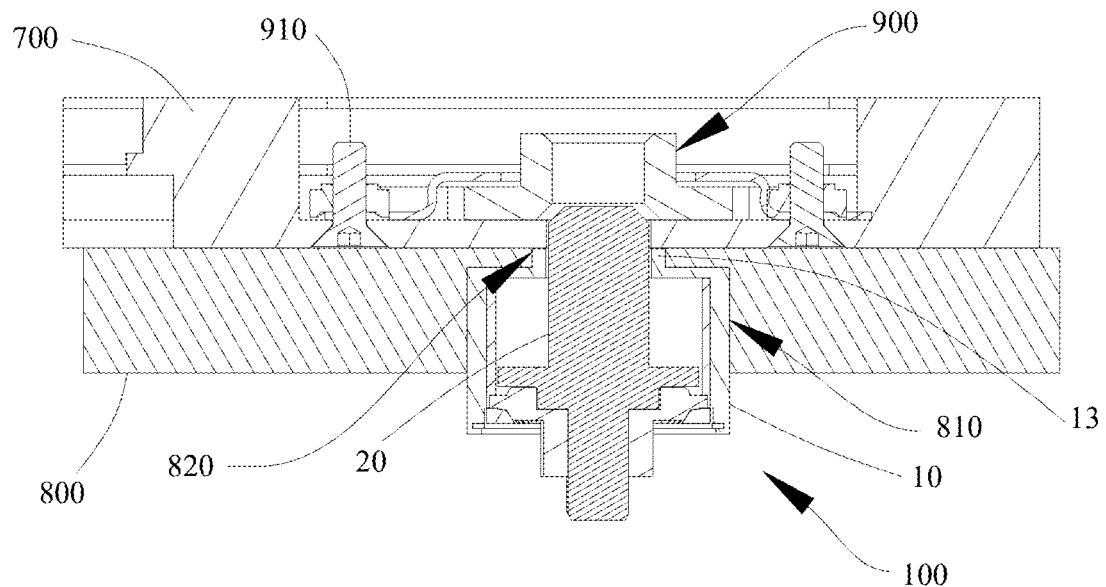
FIG. 10 is a cross-sectional view of a connecting structure according to some embodiments of this application.

Referring to FIG. 9 and FIG. 10, FIG. 9 is an exploded view of a connecting structure 1000 according to some embodiments of this application and FIG. 10 is a cross-sectional view of the connecting structure 1000 according to some embodiments of this application. According to some embodiments of this application, as shown in FIG. 9 and FIG. 10, this application further provides a connecting structure 1000 including a first substrate 700, a second substrate 800, a nut 900, and the locking apparatus 100 according to any one of the above solutions. The nut 900 is fixed on the first substrate 700 and the locking apparatus 100 is fixed on the second substrate 800. The bolt 20 of the locking apparatus 100 is connected with the nut 900 to lock the second substrate 800 to the first substrate 700.

The first substrate 700 and the second substrate 800 are two components requiring connection. As shown in FIG. 10, the nut 900 is fixed on the first substrate 700 by a threaded fastener 910.

The connection fit between the bolt 20 of the locking apparatus 100 and the nut 900 allows the second substrate 800 to be locked to the first substrate 700, which facilitates the ease of assembly and disassembly, thereby increasing the efficiency of assembly and repair.

Figure 11:
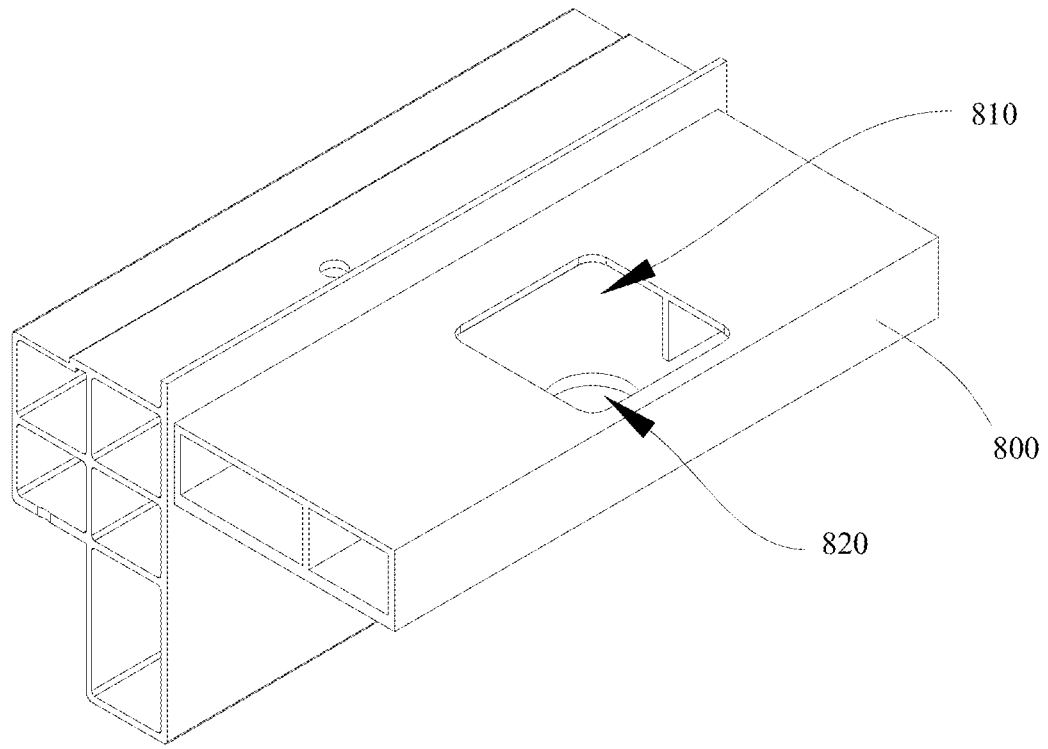
FIG. 11 is a schematic structural diagram of a second substrate according to some embodiments of this application.

Referring to FIG. 11, FIG. 11 is a schematic structural diagram of the second substrate 800 according to some embodiments of this application. According to some embodiments of this application, optionally, as shown in FIG. 10 and FIG. 11, the second substrate 800 is provided with an accommodating cavity 810, the housing 10 of the locking apparatus 100 is arranged inside the accommodating cavity 810, an inner wall of the accommodating cavity 810 is provided with a through hole 820, the housing 10 further includes a boss 13 (refer to FIG. 1 and FIG. 9) formed on the outer peripheral surface of the first wall 11 and arranged around the first opening 111, and the boss 13 is inserted in the through hole 820 and in interference fit with the through hole 820.

The inner wall of the accommodating cavity 810 is a wall enclosing the accommodating cavity 810 and the through hole 820 communicates with the inside and outside of the accommodating cavity 810. After the boss 13 is inserted in the through hole 820 in the inner wall of the accommodating cavity 810, the bolt 20 can extend out of the through hole 820 to be connected with the nut 900 fixed on the first substrate 700.

With the boss 13 inserted into the through hole 820 in the inner wall of the accommodating cavity 810 and being in interference fit with the through hole 820, a connection area between the housing 10 and the second substrate 800 is increased so as to guarantee the connecting strength between the housing 10 and the second substrate 800.

According to some embodiments of this application, optionally, as shown in FIG. 9, an outer peripheral surface of the boss 13 is provided with a plurality of fifth cogs 131 distributed along the circumferential direction.

With the housing 10 of the locking apparatus 100 fitting with the second substrate 800, the boss 13 is inserted into the through hole 820 in the inner wall of the accommodating cavity 810 and the plurality of fifth cogs 131 are in interference fit with the through hole 820. The provision of the plurality of fifth cogs 131 increases the contact area between the boss 13 and the hole wall of the through hole 820, providing a good anti-rotation effect and improving the connecting strength between the housing 10 and the second substrate 800.

According to some embodiments of this application, optionally, as shown in FIG. 9 and FIG. 11, the housing 10 is rectangular and the accommodating cavity 810 matches the housing 10 in shape.

With the housing 10 being rectangular, the outer peripheral surface of the housing 10 is a quadrangular cylindrical surface, meaning that the housing 10 has four cylindrical surfaces connected in sequence in the circumferential direction, where the four cylindrical surfaces are arranged opposite in pairs.

The rectangular shape can prevent the housing 10 from rotating relative to the second substrate 800, providing a good anti-rotation effect.

According to some embodiments of this application, optionally, the nut 900 is a floating nut to help fit of the bolt 20 with the nut 900, thus ensuring accuracy of assembly.

According to some embodiments of this application, this application further provides an electric device including a device body, a battery, and the connecting structure 1000 according to any one of the above solutions. The first substrate 700 is fixed on the device body and the second substrate 800 is fixed on the battery.

The electric device may be a vehicle, for example, a new energy vehicle, or may be other devices using a battery as a power source, for example, According to some embodiments of this application, as shown in FIG. 1 and FIG. 2, this application provides a locking apparatus 100 including a housing 10, a bolt 20, a housing 30, a restraint member 40, and an elastic member 50.

The housing 10 includes a first wall 11 and a second wall 12, where the first wall 11 is provided with a first opening 111: the second wall 12 is arranged around the first wall 11, one end of the second wall 12 is connected to an edge of the first wall 11, and the other end of the second wall 12 defines a second opening 121 opposite the first wall 11.

The bolt 20 is arranged inside the housing 10 and penetrates out of the first opening 111. The bolt 20 includes a threaded portion 21, a first transmission portion 22, and a locking portion 23 which are arranged in sequence in an axial direction, where a cross-sectional area of the first transmission portion 22 is greater than that of the locking portion 23.

The sleeve 30 is arranged inside the housing 10 and fits around the bolt 20, where the sleeve 30 includes a sleeve body 31 and a first flange 32 extending from one end of the sleeve body 31 in a radial direction, the sleeve body 31 fits around the locking portion 23 and is in circumferential lock fit with the locking portion 23, the first flange 32 is provided with a second transmission portion 33 corresponding to the first transmission portion 22, and the second transmission portion 33 is in transmission fit with the first transmission portion 22.

The restraint member 40 is fixed on the housing 10 and arranged at the second opening 121: the restraint member 40 is a ring structure and an outer peripheral surface of the restraint member 40 is in circumferential lock fit with the second wall 12 of the housing 10. When the restraint member 40 is joined with the sleeve 30, the inner peripheral surface of the restraint member 40 is in circumferential lock fit with the first flange 32.

The elastic member 50 is arranged inside the housing 10, two ends of the elastic member 50 respectively abut against the first wall 11 and the first flange 32 of the sleeve 30, and the elastic member 50 is configured to apply an axial elastic force on the sleeve 30 such that the sleeve 30 and the restraint member 40 are joined.

With the elastic member 50 arranged between the first wall 11 and the sleeve 30, the axial space inside the housing 10 is properly utilized, reducing the size of the bolt 20 in the axial direction, so that the size of the locking apparatus 100 in the axial direction can be designed to be smaller, thereby reducing the installation space occupied so as to adapt to different installation conditions.

Although this application has been described with reference to the preferred embodiments, various modifications to this application and replacements with equivalents of the components herein can be made without departing from the scope of this application. In particular, as long as there is no structural conflict, the various technical features mentioned in the embodiments can be combined in any manners. This application is not limited to the specific embodiments disclosed in this specification, but includes all technical solutions falling within the scope of the claims.

The invention claimed is:

1. A locking apparatus, comprising:
a housing, comprising a first wall provided with a first opening;
a bolt, arranged inside the housing and penetrating out of the first opening;
a sleeve, arranged inside the housing and fitting around the bolt, wherein the sleeve and the bolt are circumferentially locked and relatively movable in an axial direction;
a restraint structure, fixed at the housing and configured to prevent the sleeve from departing from the housing in a direction leaving the first wall; and
an elastic structure, arranged inside the housing and configured to apply an axial elastic force on the sleeve such that the sleeve and the restraint structure are joined, wherein the restraint structure is configured to circumferentially lock the sleeve when being joined with the sleeve;
wherein two ends of the elastic structure respectively abut against the first wall and the sleeve,
the housing further comprises a second wall arranged around the first wall, one end of the second wall being connected to an edge of the first wall and the other end of the second wall defining a second opening opposite the first wall, wherein the restraint structure is arranged at the second opening, and
an inner surface of the second wall is provided with a step face and the locking apparatus further comprises a circlip, wherein a side of the restraint structure facing the first wall abuts against the step face and a side of the restraint structure facing away from the first wall abuts against the circlip, so as to axially lock the restraint structure.

2. The locking apparatus according to claim 1, wherein the bolt comprises a threaded portion, a first transmission portion, and a locking portion which are arranged in sequence in the axial direction, wherein the first transmission portion and the sleeve are in transmission fit, the locking portion and the sleeve are in circumferential lock fit, and a cross-sectional area of the first transmission portion is greater than that of the locking portion.

3. The locking apparatus according to claim 2, wherein the sleeve comprises a sleeve body and a first flange extending from one end of the sleeve body in a radial direction, wherein the sleeve body fits around the locking portion and is in circumferential lock fit with the locking portion, the first flange is provided with a second transmission portion corresponding to the first transmission portion, the second transmission portion is configured to be in transmission fit with the first transmission portion, and the elastic structure abuts against the first flange.

4. The locking apparatus according to claim 3, wherein the bolt further comprises a second flange, the second flange is opposite the first flange in the axial direction, the threaded portion and the locking portion are located on two sides of the second flange, and the first transmission portion is arranged at the second flange.

5. The locking apparatus according to claim 4, wherein one of the first transmission portion and the second transmission portion is a protrusion and the other is a depression matching the protrusion in shape.

6. The locking apparatus according to claim 5, wherein the first transmission portion and the second transmission portion are in spline fit.

7. The locking apparatus according to claim 3, wherein an outer peripheral surface of the sleeve body is a polygonal cylindrical surface.

8. The locking apparatus according to claim 3, wherein an inner peripheral surface of the sleeve body and an outer peripheral surface of the locking portion are both polygonal cylindrical surfaces.

9. The locking apparatus according to claim 1, wherein the sleeve is provided with a plurality of first cogs distributed along the circumferential direction, and the restraint structure is provided with a plurality of second cogs distributed along the circumferential direction, wherein the plurality of second cogs are configured to be engaged with the plurality of first cogs to circumferentially lock the sleeve.

10. The locking apparatus according to claim 1, wherein an outer peripheral surface of the restraint structure is provided with a plurality of third cogs distributed along the circumferential direction, and the inner surface of the second wall is provided with a plurality of fourth cogs distributed along the circumferential direction, wherein the plurality of third cogs are engaged with the plurality of fourth cogs to circumferentially lock the restraint structure.

11. A connecting structure, comprising:
a first substrate;
a second substrate;
a nut, fixed on the first substrate; and
the locking apparatus according to claim 1, wherein the locking apparatus is fixed on the second substrate and the bolt of the locking apparatus is connected with the nut to lock the second substrate to the first substrate.

12. The connecting structure according to claim 11, wherein the second substrate is provided with an accommodating cavity, the housing of the locking apparatus is arranged inside the accommodating cavity, an inner wall of the accommodating cavity is provided with a through hole, and the housing further comprises a boss, wherein the boss is formed on an outer surface of the first wall and arranged around the first opening and the boss is inserted in the through hole and in interference fit with the through hole.

13. The connecting structure according to claim 12, wherein an outer peripheral surface of the boss is provided with a plurality of fifth cogs distributed along the circumferential direction.

14. The connecting structure according to claim 12, wherein the housing is rectangular and the accommodating cavity matches the housing in shape.

15. An electric device, comprising:
a device body;
a battery; and
the connecting structure according to claim 11, wherein the first substrate is fixed on the device body and the second substrate is fixed on the battery.

* * * * *